Nov. 15, 1927. 1,648,965
J. A. SIMONS
VEHICLE BODY
Filed Nov. 14, 1925 5 Sheets-Sheet 2

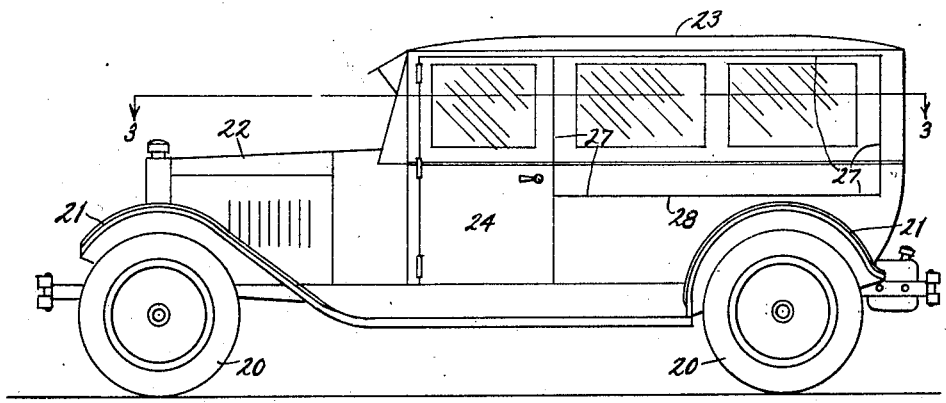
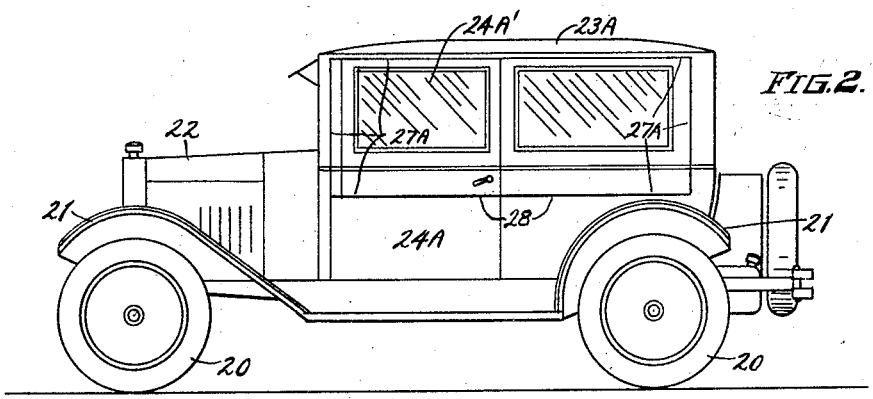
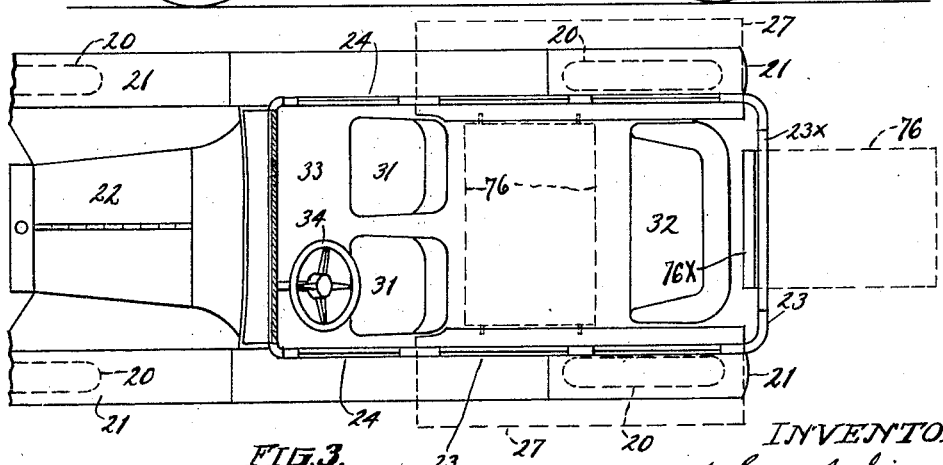

INVENTOR:
John A. Simons
BY David E. Carlsen
ATTORNEY.

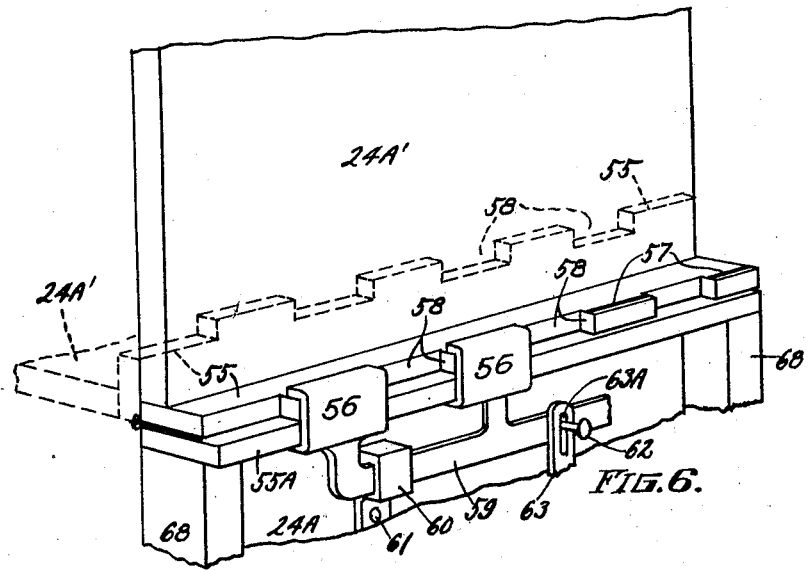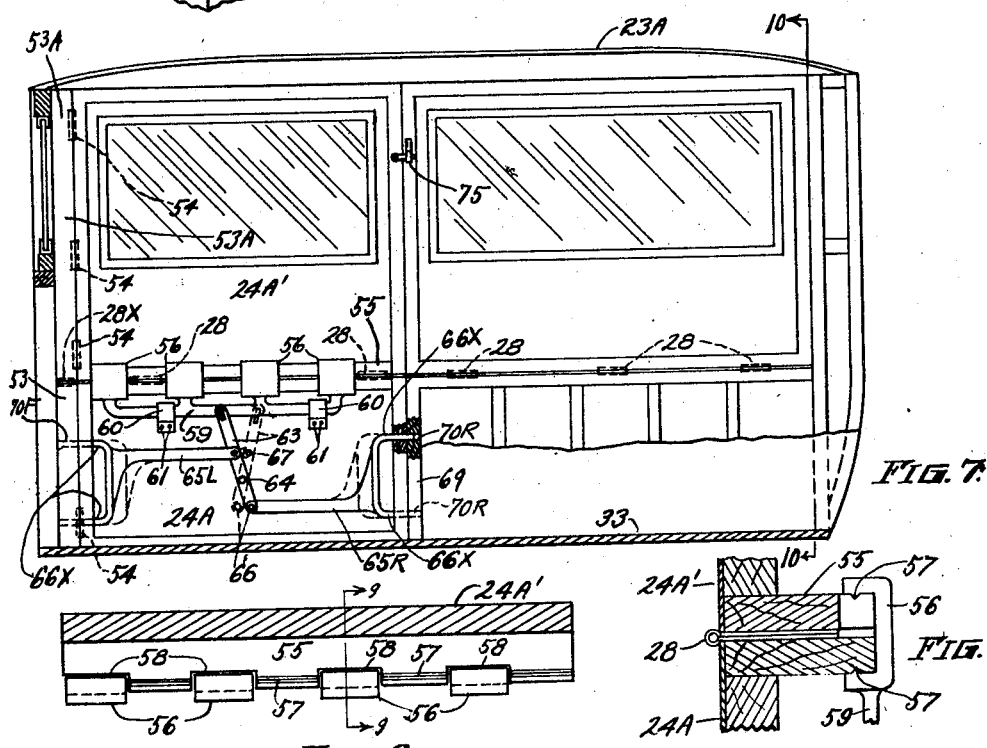

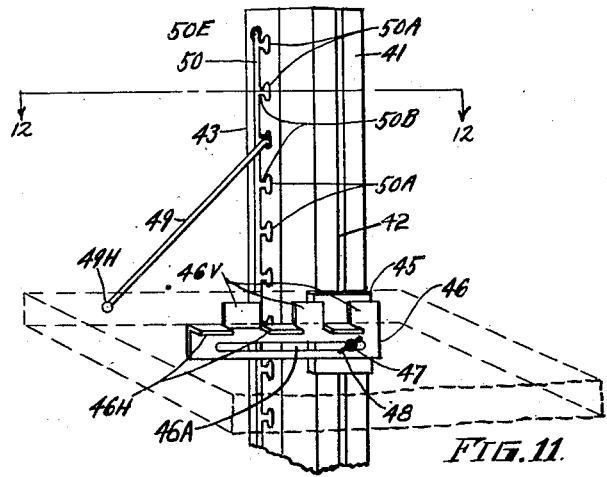
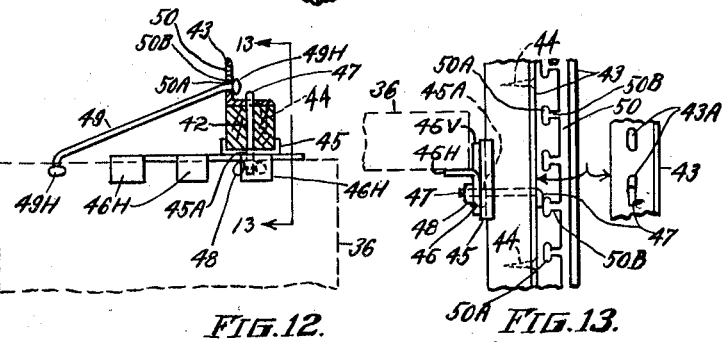
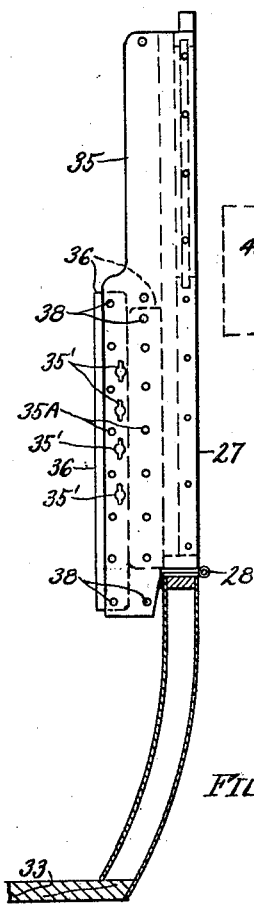
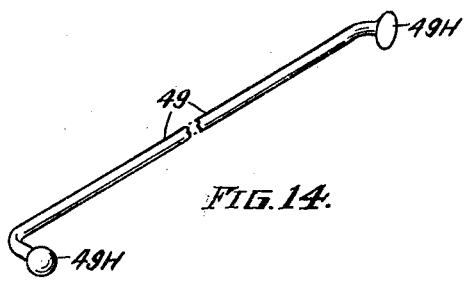

Nov. 15, 1927.
J. A. SIMONS
1,648,965
VEHICLE BODY
Filed Nov. 14, 1925     5 Sheets-Sheet 5
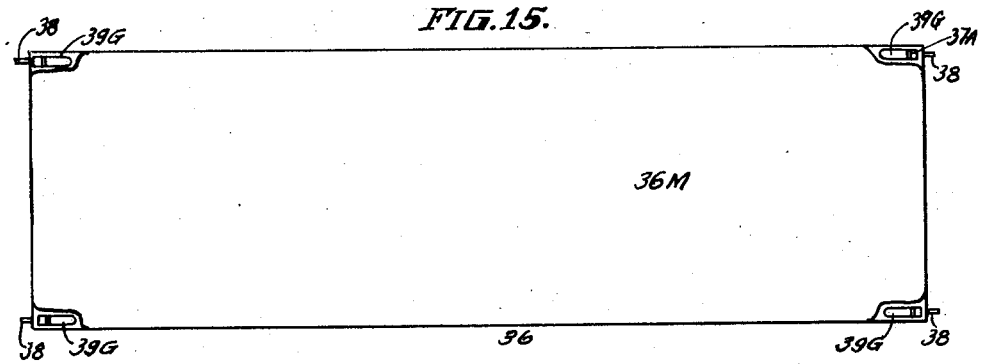
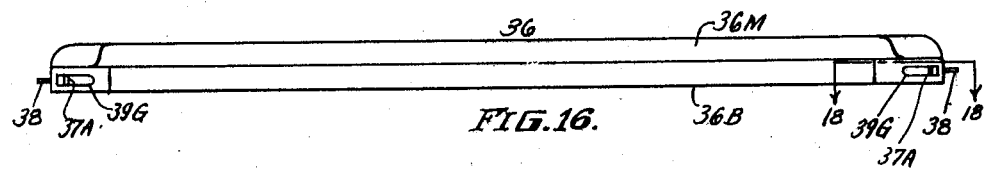
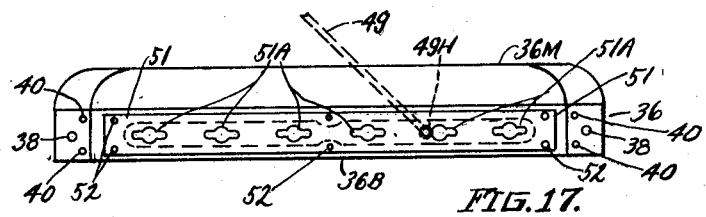
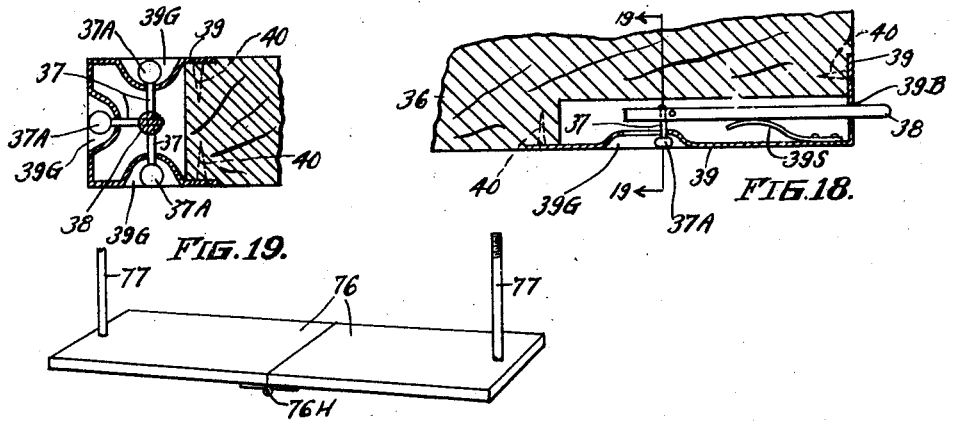
INVENTOR:
John A. Simons
BY David E. Carlsen
ATTORNEY.

Patented Nov. 15, 1927.

1,648,965

UNITED STATES PATENT OFFICE.

JOHN A. SIMONS, OF MONTEVIDEO, MINNESOTA.

VEHICLE BODY.

Application filed November 14, 1925. Serial No. 69,020.

My invention relates to vehicle bodies, particularly a body for motor driven vehicles of the inclosed types. The object is to provide a vehicle body which has the general outward appearance of a regular inclosed car but is readily arranged for sleeping and eating or living quarters for the occupants. Another object is to further improve on my United States Patent No. 1,479,258, issued January 1, 1924.

In the accompanying drawing:

Fig. 1 is a left side elevation of a large type of inclosed automobile embodying my improved construction.

Fig. 2 is a left side elevation of a small type automobile of the inclosed type, with a comparatively short body, and embodying my improved construction.

Fig. 3 is a sectional view as on line 3—3 in Fig. 1 and showing a preferred floor plan.

Fig. 6 is an enlarged fragmentary interior view showing certain door-section locking mechanisms used in the type of car shown in Fig. 2.

Fig. 7 is an enlarged interior view or elevation of the right hand wall of the car type shown in Fig. 2; some of the interior wall parts being omitted to expose the door locking mechanism and other details.

Fig. 8 is a top view of Fig. 6 with all the door locking slides S shown in non-locking position and Fig. 9 is an enlarged sectional view as on line 9—9 in Fig. 8.

Fig. 10 is an enlarged sectional view as on line 10—10 in Fig. 7 showing mainly the construction of the end of a tiltable wall section.

Fig. 11 is an enlarged perspective view of one of the upright car body posts adjacent each end of the hinged wall sections.

Fig. 12 is a sectional view as on line 12—12 in Fig. 11.

Fig. 13 is a detail elevation as on line 13—13 in Fig. 12.

Fig. 14 is a detail of a brace member used for supporting and bracing the table-bed members of my device in various positions.

Fig. 15 is a face view of a table-bed several of which are carried in each car.

Fig. 16 is an edge view of Fig. 15.

Fig. 17 is an enlarged end view of Fig. 16.

Fig. 18 is an enlarged section of the bed-table about as on line 18—18 in Fig. 16 and showing the retractable pivot construction used at each corner.

Fig. 19 is a further enlarged sectional view as at 19—19 in Fig. 18 showing the means providing access to manipulate the pivot pin from three sides. Fig. 20 is a perspective view of a special table 76.

Figure 4:
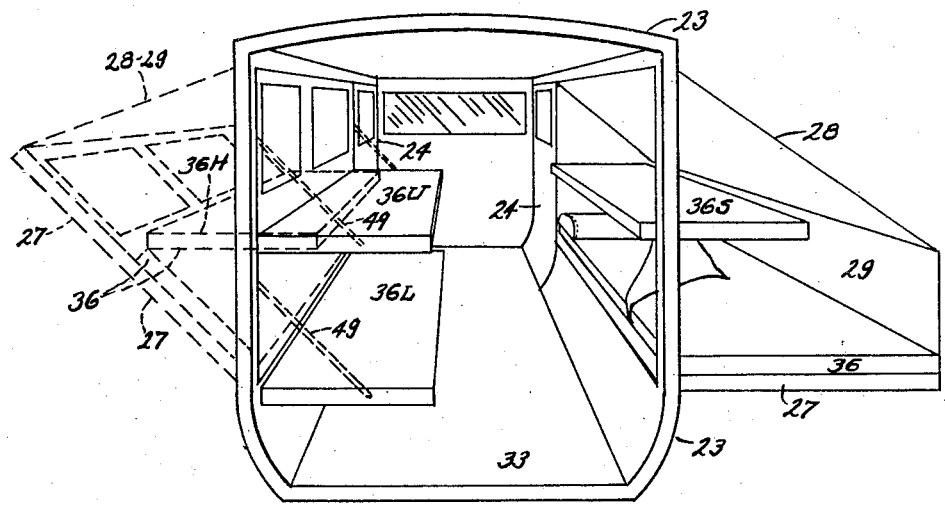
Fig. 4 is an interior view of the type of body shown in Fig. 1 looking forward from a point near the rear wall of the vehicle and showing various mountings of the bed-table devices and also showing the left side wall in dotted lines, in inclined position.

Referring to the drawing by reference numerals, 20 designates the wheels of any suitable automobile; 21 the fenders and 22 the engine hood. In Figs. 1, 3 and 4, 23 designates a long type inclosed car body of the so called coach type in which there is but one door 24 at each side. In Figs. 2 and 5, I have illustrated a smaller type of coach body 23$^a$ also having only one door 24$^a$ on each side, this type of car body embodying the main features of my invention but involving a certain improved door construction hereinafter described.

Figure 5:
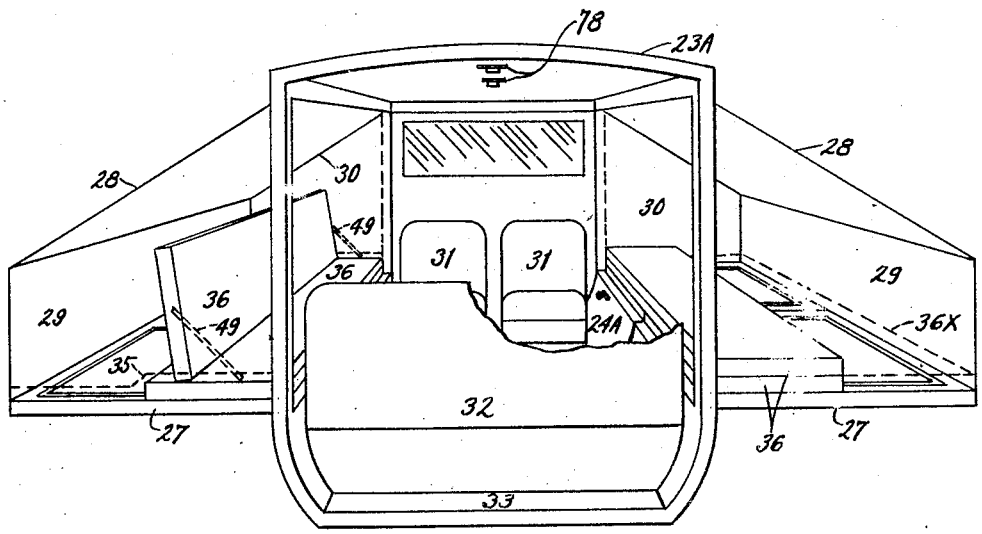
Fig. 5 is a modification of Fig. 4.

This improved vehicle body involves the use of some of the main features of my former patent and may be briefly stated as follows:

The side walls of the vehicle comprise mainly a rectangular section 27 as in Figs. 1, 3 and 4 and all rearward of the door 24; or 27$^a$ in Figs. 2 and 5 and including the upper part of door 24$^a$; either type being hinged on line 28 at its lower horizontal edge.

These wall sections may be let down to a horizontal plane (as to the right in Fig. 4 and both sides in Fig. 5) or let partly down as indicated dotted to the left in Fig. 4. 28 is an angular canopy, 29 an integral wall and 30 (in Figs. 4 and 5) indicate end walls contiguous thereto, said parts 28—29—30 constituting a canvas tent-like covering or housing at each side of the car body and held in place by means disclosed in my former patent as well as the means for rolling or collapsing said parts into the car when not in use.

31 in Figs. 3 and 5 indicate a two-part or two separate front seats and 32 is a larger or single rear seat all removably fixed to the floor 33 of the car. 34 is the regular steering wheel.

At both ends of each hinged wall member I secure a metal plate 35 (see Fig. 10) between each pair of which is pivotally suspended preferably two bed-tables 36 which may more aptly be termed shelves. When the wall section 27 is in vertical position these shelves are fixed parallel to and against each other and said wall by slidable hinge pins 38 arranged one at each corner of the shelf within a suitable hollow housing 39 fixed as at 40, each said pin having preferably three arms 37 with knobs $37^a$ at their outer ends and accessible and movable within a groove $39^G$ of the housing so that the pin may be reciprocated in an end aperture $39^B$ of the housing to engage or be disengaged from any of the apertures $35^A$ of the adjacent end plate 35 (see Figs. 10 and 15 to 19 incl.). $39^S$ is a suitable leaf spring fixed within each housing 39 and adapted to engage frictionally the pin 38 and prevent accidental end movement of it. Each pair of shelves 36 is held close to the lower part of a wall section (when not in use) as in Fig. 10.

It will be readily seen that each pair of shelves may be swung inwardly from the wall section, for example in Fig. 10 the upper pins 38 of the inner shelf 36 may be retracted and the shelf may be swung inwardly on its lower pins 38 as to position $36^L$ in Fig. 4. Then the lower pins of the outer shelf are accessible and may be retracted and said shelf swung upwardly and inwardly on its upper pins 38 about as to position $36^U$ in Fig. 4. The two shelves thus swung into the car provide two vertically spaced shelves or beds held in horizontal plane by further means presently to be described. If the same procedure is taken on both sides the shelving or bed space is doubled and practically the entire interior of the car body may be used for storage or for sleeping quarters without letting down the side walls.

The shelf members 36 of the car are preferably made of a light flat material, either wood or sheet iron, presenting one side of solid surface as $36^B$ and on top of which is secured any suitable mattress $36^M$. It is obvious that the shelves may be arranged selectively with either the mattress side or hard surfaced side up, the former of course to provide sleeping quarters and the latter for table or other uses.

When the hinged side walls 27 are both let down to their horizontal position the sleeping quarters are arranged entirely within the extended sides and the space between the stationary car walls is available for other purposes.

Assuming that the wall section illustrated in Fig. 10 is dropped down to the horizontal position shown to the right in Fig. 5 it is seen that the shelves 36 will remain in position shown in Fig. 5. The top one of the latter (the inner one in Fig. 10) is simply released and moved over parallel to and outwardly of the lower shelf to position indicated in dotted line $36^X$ in Fig. 5, filling in the entire space covering the wall section 27 and providing a wide bed as indicated to the lower right in Fig. 4.

In Fig. 4 the left wall section 27 is shown dotted in outwardly inclined position in which case one shelf 36 may be fixed in horizontal plane as $36^H$ as a shelf for storage while the other side is used for sleeping quarters. $36^S$ in Fig. 4 shows a single shelf arranged horizontally above the bed on the side wall and may be used for storage or an upper bed while the shelf $36^H$ to the left is available as a table or for other purposes.

I will now describe the means for holding one or more of the shelves 36 in various horizontal plane positions either when two of the corners may be pivotally secured to the end plates 35 or when the shelf is entirely free of such pivotal connection.

The car body posts at each end of the pivoted wall sections, designated 41 are slotted vertically as 42 in Figs. 11, 12, and at one side of each post is fixed as at 44 an angle iron 43 one flange of which covers the said slot 42 but has a row of elongated apertures $43^A$ (Figs. 12 and 13) registering with said slot 42. 45 is a channel shaped adjustable slide normally engaging the post on the side opposite the angle iron 43 (or toward the wall opening), said channel having an aperture $45^A$ in its web (Figs. 12 and 13) registering with the post slot 42. 46 is a normally horizontal angle iron the vertical flange of which is slotted, as $46^A$, longitudinally and its horizontal flange arranged above said slotted part and comprising a row of alternately arranged vertical and horizontal tongues $46^V$ and $46^H$ respectively (see Figs. 11, 12 and 13). The angle iron 46 may best be termed a shelf support. 47 is an L-shaped bolt slidable in the post groove 42 and its short arm adapted to be passed through any one of the slots $43^A$ of angle iron 43 and engage same while its shank rests in the bottom of the groove (see Figs. 13 and 12) and extends horizontally through the aperture of slide 45 thence through slot $46^A$ of the shelf support 46 where its protruding end is threaded to receive a suitable adjustment nut 48. Adjustment of said nut 48 will clamp the shelf support against the guide 45 and to the post 41 with the shelf support in any desired horizontal position with its lips 46$^H$ supporting the under side of one end of shelf 36 while the lips 46$^V$ loosely engage the vertical end surface of the shelf. Fig. 11 shows this supporting means most clearly at one post 41 and one end of a shelf 36 shown in dotted outline.

When a shelf 36 is supported at both ends by the above described means but is mainly to one side of said posts, it is obvious that its overhung part as to the left in Figs. 11 and 12 must be braced and in anti-slipping position. For this purpose I provide for each car a number of bar iron braces 49 both ends of which are enlarged or formed with a button head 49$^H$ directed from the bar at right angles to each other (see Figs. 11, 12 and 14). One of these heads 49$^H$ of each brace is insertible in an enlargement 50$^E$ at the upper end of a vertical slot 50 in the free flange of the angle iron 43 (of which one is fixed on each post). Said slot is slidably engageable by the brace 49 which is retained by its head 49$^H$ in any one of a row of vertically arranged slots 50$^A$ arranged parallel to the main slot 50 and each communicable therewith by a horizontal passage 50$^B$ (see Figs. 11, 12 and 13). The button head 49$^H$ will of course thus retain the one end of each brace 49 at any desired elevation in a desired notch 50$^A$ while the brace bar itself is extended diagonally therefrom and its lower end and its button head 49$^H$ are removably engageable in any one of a series of slots 51$^A$ in a plate 51 fixed as at 52 in the end of the shelf 36 (see Fig. 17). Said plates are provided one at each end of all the shelves 36 so that each shelf can be properly supported or braced at both ends. Each slot 51$^A$ is enlarged at its center for insertion of the head 49$^H$ which is then pushed toward either small end of the slot to be retained by the head 49$^H$ engaging the inner wall of the plate.

In Fig. 5 one shelf (to the left) 36 is shown in upright plane to be used as a back of a settee formed by it and the other shelf 36 resting on the lower inner part of the wall 27. In this case two of the braces 49 are used one end of each brace secured in the end of the upright shelf and the other end removably fixed in apertures 35' in the adjacent wall end plate 35. Said end plate 35 is indicated in dotted line only in Fig. 5 but in Fig. 10 the apertures 35' are clearly shown as being similar to the slots 51$^A$ of the shelf ends.

I have previously mentioned that the hinged wall sections may comprise a rectangular section rearward of the front doors of a car with a long body, as in Fig. 1, but for shorter cars as in Fig. 2 the said hinged wall sections comprise practically the entire wall including each door 24$^A$. In the latter case the hinge line 28 is continued across the door 24$^A$ or in other words the door has an upper section of equal width vertically and in alignment with the hinged wall section back of the door (see Fig. 7). In Figs. 6–9 inclusive the upper and lower door parts are designated 24$^{A'}$ and 24$^A$, respectively, and in Fig. 7 is most clearly shown means for holding said door parts rigidly together when it is used as a door. In said Fig. 7 the front door post comprises two vertically alined parts of which 53 is the lower fixed part comprising a part of the car body and the top part 53$^A$ is hinged to it at 28$^X$. The door is hinged at 54 to the aligned post members.

At the hinge line 28 of the door its upper and lower sections have abutting ledges or timbers 55—55$^A$ respectively and the inner adjacent edges of which are slidably engaged by a row of spaced clamp-guides 56 preferably guided in grooves 57 in both ledges. These clamps engage the upper and lower side of said ledges simultaneously and thus hold the upper and lower door sections in proper fixed relation. However, the upper ledge 55 is provided with spaced notches 58 so spaced that when the guides 56 are moved a certain distance they will occupy these notched parts and the upper door section 24$^{A'}$ is free to be swung outwardly on its hinges 28—28$^X$ together with the rest of the hinged side wall rearward of the door 75, in Fig. 7, is any suitable type of catch or locking member to hold the door and said wall section in proper alinement when they are lowered to horizontal position. When the entire hinged wall is thus swung out it is obvious that the lower door section 24$^A$ must be rigidly fixed to the car body, which condition I have provided for as follows:

It will first be understood that the clamp guides 56 are rigidly connected or formed integral with a single horizontally arranged slide bar 59 guided in brackets 60 fixed at 61 in the wall of door section 24$^A$ (see Fig. 9). This slide bar is movable by means of an inwardly directed finger-catch pin 62 (see Figs. 6 and 7) fixed in bar 59 and said pin also is engaged in a slot 63$^A$ of a vertically arranged beam lever 63 pivoted at 64 in the wall of the door section 24$^A$ and below bar 59. 65$^R$ and 65$^L$ are respectively right and left bolt sliding members pivotally connected to lever 63 below and above the fulcrum 64, at 66 and 67 respectively. These slide members comprise each at its outer end two or more vertically spaced fingers 66$^X$ slidably retained in the opposite vertical frame members 68 of the door (see Fig. 7). The adjacent vertical fixed frame members 53 and 69$^X$ of the car body have apertures 70$^F$ and 70$^R$ respectively and which are occupied by the sliding fingers when lever 63 is rocked (as in Fig. 7) with its upper end forward. This latter movement locks the lower door section in rigid position and the forward motion of the upper end of the lever 63 simultaneously moves bar 59 forward and thus the clamp guides are moved into notches 58 of the upper door section in non-clamping position and the said upper door section is then free to be swung outwardly.

In the short body type of car just described the bed-tables or shelves 36 may be made as long as the entire foldable wall including the door, and the front door post plate 35 must of course be secured on the post 53^A (Fig. 7). In this case it is of course clear that full length shelves cannot be conveniently stored within the car but they may be stored on the roof as shown in my Patent #1,479,258, issued Jan. 1—1924. It may be better to omit the bed-tables entirely and provide instead air-mattresses (not shown) laid on suitable boards or plates (not shown) the latter to protect the windows.

In Fig. 20 is shown an independent table member 76 foldable at 76^H about at the middle. 77 are table suspension rods one at each end of the table and removable therefrom. These rods may be threaded at their ends to engage in threaded flanges 78 (Fig. 5) in the roof of the car to suspend the table member rigidly from the roof and longitudinally in the center of the car (not shown). Thus a table is provided at which persons may be seated on all four sides. The table may be folded up and stored at the rear wall as in Fig. 3 or it may be used as a table laid across the interior of the car, between the front and rear car seats, as at 76^x. If it be assumed that the car body is made with a rear door (23^x in Fig. 3) of the type shown in my patent of January 1, 1924, it is obvious that the table may be extended outwardly and rearwardly of the car when laid on the floor, as shown dotted, and thus serves as an outdoor table. This extra table is particularly useful when all the bed-tables 36 are in use. The means for suspending shelf 36 may of course be varied considerably. When extended this table member may be used in place of the bed-table 36^s of Fig. 4.

The use of my improved vehicle body has been fully disclosed. It is obvious that it is possible to mount the shelves in many different positions other than those shown and with the means described and shown but this involves simply different applications of the same parts according to requirements.

What I claim is:

1. In a car of the class described, a car body provided with a door in each side wall and each said side wall having its major upper part of the entire length of the car body including the upper part of the door in each wall hinged to fold horizontally outwardly, said door in each wall comprising an upper section and a lower section hinged together on a line coinciding with the hinges of the wall section, said door being hinged also vertically at one edge, above and below its horizontally arranged hinges, means for interlocking said upper and lower door sections when the door is to be used as such, and means for locking the lower part of said door to adjacent fixed body parts when said interlocking means are moved to release the upper door section and permit it to be folded outward on its horizontal hinges together with the adjacent hinged wall section.

2. In a car of the class described, a car body provided with a door in each side wall and each said side wall having its major upper part of the entire length of the car body including the upper part of the door in each wall hinged to fold horizontally outwardly, said door in each wall comprising an upper section and a lower section hinged together on a line coinciding with the hinge line of the wall section, said door being hinged also vertically above and below its horizontal hinge line, means interlocking said upper and lower door sections when the door is to be used as such, and means for locking the lower part of the door to adjacent fixed body parts when said interlocking means are moved to release the upper door section; said interlocking means for the door sections consisting of inwardly directed ledges one at the lower edge of the upper door section and one at the upper edge of the lower door section, said upper ledge having a row of spaced projections with intermediate notches; a plurality of U-shaped rigidly connected slidable jaw members adapted to simultaneously engage said projections of the upper ledge and the lower ledge to hold the door sections in proper alinement and means for moving said jaws horizontally to simultaneously release said spaced projections when the upper parts of the jaws are moved into the notches between the upper ledge projections.

3. In a car of the class described, a car body provided with a door in each side wall and each said side wall having its major upper part of the entire length of the car body including the upper part of the door in each wall hinged to fold horizontally outwardly, said door in each wall comprising an upper section and a lower section hinged together on a horizontal line coinciding with the hinge line of the wall section, said door being hinged also vertically above and below its horizontal hinge line, means interlocking said upper and lower door sections when the door is to be used as such, and means for locking the lower part of the door to adjacent fixed body parts when said interlocking means are moved to release the upper door section; said means for locking each lower door section consisting of an upright lever fulcrumed to the central part of said door section, horizontally slidable door locking members pivotally secured to said lever one at each side of its fulcrum, said locking members extending in opposite directions from the lever and each provided with a number of vertically arranged bolts retained in the side frame members of the door, apertures in the parts of the car body adjacent both door sides and means to oscillate said lever and move the sliding bolts into said apertures.

In testimony whereof I affix my signature.

JOHN A. SIMONS.